(12) United States Patent
Izawa et al.

(10) Patent No.: US 11,410,822 B2
(45) Date of Patent: Aug. 9, 2022

(54) SWITCH AND KEYBOARD

(71) Applicant: OMRON Corporation, Kyoto (JP)

(72) Inventors: Kazuhira Izawa, Okayama (JP);
Hiroaki Fujino, Okayama (JP);
Mamiko Naka, Okayama (JP); Kenshi Nagata, Tottori (JP)

(73) Assignee: Omron Corporation, Kyoto (JP)

( * ) Notice: Subject to any disclaimer, the term of this patent is extended or adjusted under 35 U.S.C. 154(b) by 219 days.

(21) Appl. No.: 16/305,677

(22) PCT Filed: Apr. 13, 2017

(86) PCT No.: PCT/JP2017/015174
§ 371 (c)(1),
(2) Date: Nov. 29, 2018

(87) PCT Pub. No.: WO2017/208643
PCT Pub. Date: Dec. 7, 2017

(65) Prior Publication Data
US 2020/0328047 A1    Oct. 15, 2020

(30) Foreign Application Priority Data

Jun. 2, 2016  (JP) .............................. JP2016-111340
Mar. 15, 2017 (JP) .............................. JP2017-049830

(51) Int. Cl.
*H01H 13/14* (2006.01)
*G06F 3/02* (2006.01)
(Continued)

(52) U.S. Cl.
CPC .............. *H01H 13/14* (2013.01); *G06F 3/02* (2013.01); *H01H 3/125* (2013.01); *H01H 13/52* (2013.01);
(Continued)

(58) Field of Classification Search
CPC .. H01H 3/125; H01H 13/7065; H01H 13/702; H01H 2235/01; H01H 13/14;
(Continued)

(56) References Cited

U.S. PATENT DOCUMENTS 5,947,616 A    9/1999 Liang
6,723,935 B1   4/2004 Watanabe
(Continued)

FOREIGN PATENT DOCUMENTS

CN    2800464 Y    7/2006
CN    103594270 A  2/2014
(Continued)

OTHER PUBLICATIONS

Office Action issued in Chinese Application No. 201780033471.4, dated May 28, 2019 (13 pages).
(Continued)

*Primary Examiner* — Lheiren Mae A Caroc
(74) *Attorney, Agent, or Firm* — Osha Bergman Watanabe & Burton LLP

(57) ABSTRACT

Embodiments disclosed herein describe a base, an operation unit that moves in a contacting/separating direction with respect to the base in response to an external force, and a pair of link members turnably coupled to each other by a coupling portion and configured to guide movement of the operation unit in the contacting/separating direction. The pair of link members includes a first curved portion and a second curved portion that are supported on the base, and a first rotary spindle and a second rotary spindle that are supported on the operation unit. When the operation unit moves in the contacting/separating direction with respect to the base, the first curved portion and the second curved portion slide with respect to the base in a direction substantially perpendicular to the contacting/separating direction (Continued)

and in a direction substantially perpendicular to a turning shaft of the pair of link members.

5 Claims, 6 Drawing Sheets

(51) Int. Cl.
    *H01H 13/52*     (2006.01)
    *H01H 13/702*     (2006.01)
    *H01H 3/12*     (2006.01)

(52) U.S. Cl.
    CPC ..... *H01H 13/702* (2013.01); *H01H 2013/525* (2013.01); *H01H 2221/058* (2013.01); *H01H 2233/07* (2013.01); *H01H 2235/01* (2013.01)

(58) Field of Classification Search
    CPC ................ H01H 13/70; H01H 13/705; H01H 2221/058; H01H 13/84; H01H 13/86; H01H 13/52; H01H 3/12; G06F 3/02
    USPC ................................. 200/5 a, 344, 341, 345
    See application file for complete search history.

(56) References Cited

U.S. PATENT DOCUMENTS

| | | | |
|---|---|---|---|
| 6,730,868 B1 | 5/2004 | Watanabe | |
| 7,094,984 B2 | 8/2006 | Yokoyama | |
| 8,299,382 B2* | 10/2012 | Takemae | H01H 3/125 200/344 |
| 8,759,705 B2* | 6/2014 | Funakoshi | H01H 13/36 200/532 |
| 10,236,138 B2* | 3/2019 | Chen | H01H 13/7065 |
| 10,714,282 B2* | 7/2020 | Izawa | H01H 13/88 |
| 11,004,628 B2* | 5/2021 | Izawa | H01H 13/78 |
| 2008/0006516 A1 | 1/2008 | Nishino et al. | |
| 2012/0118715 A1* | 5/2012 | Lin | H01H 3/125 200/344 |
| 2018/0323019 A1 | 11/2018 | Wu | |

FOREIGN PATENT DOCUMENTS

| | | |
|---|---|---|
| CN | 204497106 U | 7/2015 |
| CN | 105261507 A | 1/2016 |
| CN | 205016436 U | 2/2016 |
| CN | 105448566 A | 3/2016 |
| CN | 205645574 U | 10/2016 |
| JP | S61-145432 U | 9/1986 |
| JP | 2001-125705 A | 5/2001 |
| JP | 2004-127908 A | 4/2004 |
| JP | 2005-353478 A | 12/2005 |
| JP | 2011-049110 A | 3/2011 |
| JP | 2012-022473 A | 2/2012 |
| JP | 4869316 B2 | 2/2012 |

OTHER PUBLICATIONS

Office Action issued in corresponding Chinese Application No. 201780033760.4, dated May 31, 2019 (14 pages).
Office Action issued in Japanese Application No. 2017-050212; dated Jan. 7, 2020 (7 pages).
Office Action issued in Japanese Application No. 2017-049830; dated Jan. 7, 2020 (9 pages).
Office Action issued in Chinese Application No. 201780033471; dated Jan. 15, 2020 (13 pages).
Office Action issued in U.S. Appl. No. 16/306,055; dated Sep. 17, 2019 (6 pages).
International Search Report issued in PCT/JP2017/015174, dated Jun. 27, 2017 (2 pages).
Written Opinion issued in PCT/JP2017/015174, dated Jun. 27, 2017 (5 pages).
International Search Report issued in PCT/JP2017/015175, dated Jun. 27, 2017 (1 page).
Written Opinion issued in PCT/JP2017/015175, dated Jun. 27, 2017 (4 pages).
United States Office Action in related U.S. Appl. No. 16/306,055, dated Apr. 7, 2021 (8 pages).

* cited by examiner

SWITCH AND KEYBOARD

TECHNICAL FIELD

The present invention relates to a switch and a keyboard, the switch including a pair of link members that smoothly moves an operation unit in parallel in a contacting/separating direction even when a corner part of the operation unit is pressed.

BACKGROUND ART

As a mechanism in which an operation unit smoothly moves up and down in parallel even when a corner part of the operation unit is pushed while a low profile is achieved, for example, a mechanism using a gear shape for a link member is hitherto known. In the mechanism using the gear shape for the link member, meshing is ensured by disposing teeth shifted from each other in the link member.

However, examples of a problem with the mechanism using the gear shape for the link member include that meshing between the teeth is shallow at each of the upper and lower limit positions of a key top to make the parallel and vertical movement of the key top unstable.

For solving this problem, in a key switch device 100 disclosed in Patent Document 1, as illustrated in FIG. 6(*a*), concerning a pair of mesh type link members 110 in the same shape for guiding and supporting a key top 102 in an upward/downward direction above a base 101, a spindle 112 at one end of each arm 111 is turnably latched to the base 101 and a spindle 113 at the other end of each arm 111 is turnably latched to the key top 102. As illustrated in FIG. 7, the pair of arms 111 is integrally provided with a first tooth 114 and a second tooth 115 having tooth lengths in a direction substantially orthogonal to a turning shaft line 113*a* of the spindle 113. The first tooth 114 and the second tooth 115 are disposed at positions mutually different in the direction of the turning shaft line 113*a* just by respective tooth widths, disposed at positions mutually different in the direction of a pitch circumference just by respective tooth thickness, and formed so as to be able to specify one pitch circle with the turning shaft line 113*a* at the center.

With this configuration, the position and size of the clearance variation between the upper limit position of the key top 102 illustrated in FIG. 6(*a*) and the lower limit position of the key top 102 illustrated in FIG. 6(*b*), depending on the combination of the first tooth 114 and the second tooth 115.

This leads to reduction in backlash of both link members 110 caused by rattling of meshed parts in the key switch device 100 including the pair of mesh type link members 110.

PRIOR ART DOCUMENT

Patent Document

Patent Document 1: Japanese Unexamined Patent Publication No. 2001-125705 (published on May 11, 2001)

SUMMARY OF THE INVENTION

Problems to be Solved by the Invention

However, in the above conventional switch, the placement is made in a shape in which two gear shapes are overlapped. This requires reduction in tooth module when downsizing is to be kept, which makes it relatively difficult to ensure the accuracy in tooth shape and might hinder smooth operation, which has been problematic.

The present invention has been made in view of the above conventional problem, and it is an object of the present invention to provide a switch and a keyboard capable of more stably maintaining a state in which an operation unit faces a certain direction when the operation unit moves in a contacting/separating direction with respect to a base.

Means for Solving the Problem

For solving the above problem, a switch of one aspect of the present invention includes: a base; an operation unit disposed on the base and moving in a contacting/separating direction with respect to the base in response to an external force; a pair of link members configured to guide movement of the operation unit in the contacting/separating direction; and a coupling portion configured to turnably couple the pair of link members to each other, the pair of link members each including a coupling-portion-side supported portion supported on one of the base and the operation unit and an end-side supported portion supported on the other of the base and the operation unit. When the operation unit moves in the contacting/separating direction with respect to the base, the coupling-portion-side supported portion slides with respect to one of the base and the operation unit in a direction substantially perpendicular to the contacting/separating direction and in a direction substantially perpendicular to a rotational axis of the pair of link members.

For solving the above problem, a keyboard according to one aspect of the present invention includes a plurality of the switches described above.

Effect of the Invention

According to the switch of one aspect of the present invention, the pair of link members couples the base and the operation unit to each other. In addition, the coupling portion turnably couples between each of the pair of link members. With these configurations, when the operation unit is moved in the contact/separation direction with respect to the base, even if any portion of the operation unit is pressed, the operation unit is oriented in a certain direction, for example, parallel to the base It is possible to realize a structure capable of maintaining the state in which it is present.

Further, according to the keyboard of one embodiment of the present invention, it is possible to provide a keyboard including the switch of the above aspect capable of more stably maintaining a state in which the operation unit faces a certain direction.

MODE FOR CARRYING OUT THE INVENTION

One embodiment of the present invention will be described as follows with reference to FIGS. 1 to 5. In the following description, terms indicating specific directions or positions (e.g., terms including "upper", "lower", "right", and "left") are used as necessary. However, these terms are used to facilitate understanding of the invention with reference to the drawings, and the meanings of the terms do not limit the technical scope of the present invention. The following description is merely exemplary in nature and not intended to limit the present invention, its application, or its usage. Further, the drawings are schematic, and ratios of dimensions or the like do not necessarily agree with actual ones.

A switch according to the embodiment includes a pair of link members that smoothly moves an operation unit up and down (in a direction in which the operation unit comes into contact with or separates from the base) in parallel even when a corner part of the operation unit is pressed. The switch is suitably used in a keyboard of a personal computer or the like, for example, by detachably attaching a key top onto the operation unit. In some cases, the operation unit is used as it is as a key top. In each of sectional views illustrated in FIGS. 1(a), 1(b), 4, and 5, a resin hatching portion means resin insulating hatching. Light black given to a first link member 21 and a second link member 22 is for making the first link member 21 and the second link member 22 easier to understand, and is not hatching.

(Configuration of Switch)

Figure 2A:
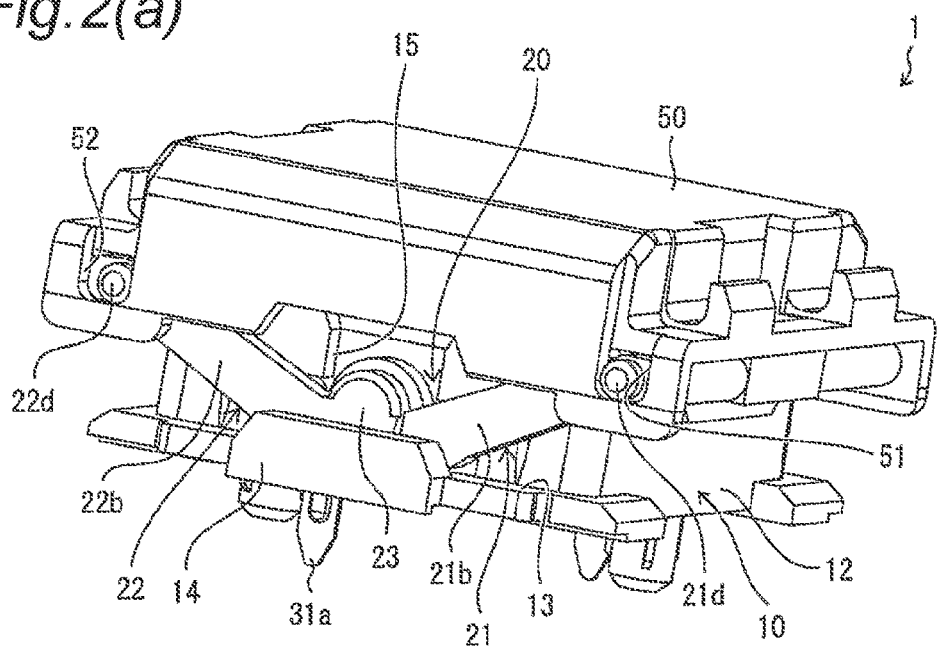
FIG. 2(*a*) is a perspective view illustrating a state of the switch when the operation unit is not depressed, and FIG. 2(*b*) is a perspective view illustrating a state of the switch when the operation unit is depressed.
Figure 2B:
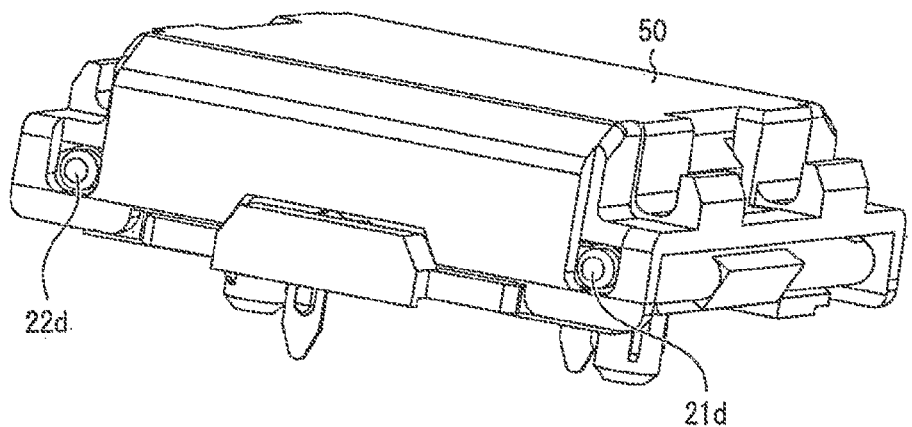
Figure 3:
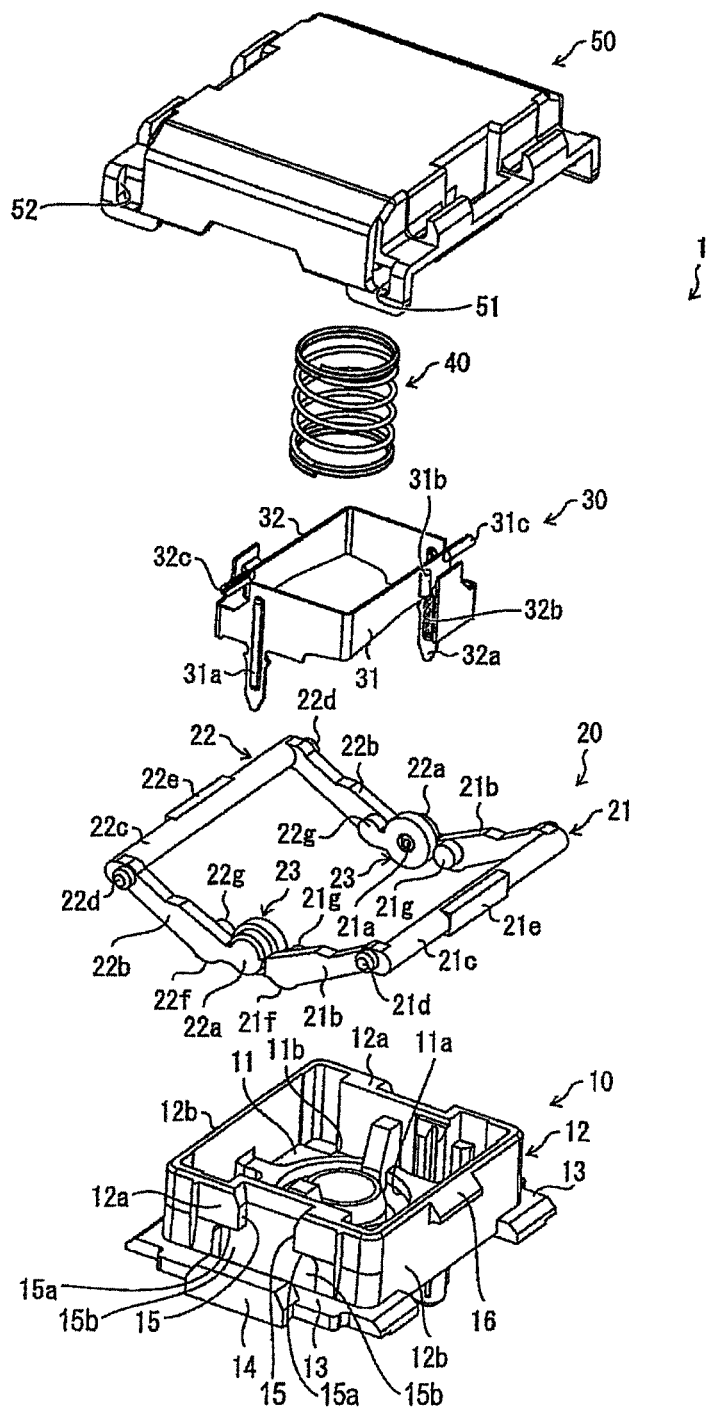
FIG. 3 is an exploded perspective view illustrating a configuration of the switch.

The configuration of the switch according to the embodiment will be described with reference to FIGS. 2(a), 2(b) and FIG. 3. FIG. 2(a) is a perspective view illustrating the configuration in a state where an operation unit 50 in the switch of the embodiment has not been depressed, and FIG. 2(b) is a perspective view illustrating the configuration in a state where the operation unit 50 in the switch 1 has been pressed. FIG. 3 is an exploded perspective view illustrating the configuration of the switch of the embodiment.

As illustrated in FIGS. 2(a) and 2(b), the switch 1 of the embodiment includes a base 10 and the operation unit 50 as an operation unit disposed above the base 10. As illustrated in FIG. 3, between the base 10 and the operation unit 50, there are provided a pair of link members 20 that interlock with each other to guide and support the operation unit 50 on the base 10 in an upward/downward direction, a switch mechanism 30 that opens and closes contacts of an electric circuit in response to upward/downward operation of the operation unit 50, and a coil spring 40.

The base 10 is made up of a square frame 12 having a bottom 11, and a guard portion 13 is formed outside a pair of one opposed side walls 12a in the square frame 12. This guard portion 13 is used to support the link member 20. Further, in the embodiment, the outer surface of the guard portion 13 is provided with an extrusion preventing wall 14 as a deformation preventing portion for preventing lateral extrusion of the elastic link member 20.

As illustrated in FIG. 3, in a center portion of the one opposed side wall 12a, a side wall recessed groove portion 15 is formed as a gap which is recessed inward. This side wall recessed groove portion 15 has a width such that a coupling portion 23 of the link member 20 and the closed first link member 21 and second link member 22 can freely move up and down. As a result, with the first link member 21 and the second link member 22 in an opened state, ** the coupling portion 23 or first and second curved projections 21g, 22g of first and second arms 21b, 22b, described later, cannot pass through the side wall concave groove portion 15. In addition, an overhanging portion (protrusion) 15a is formed in the side wall recessed groove portion 15. With the first link member 21 and the second link member 22 in the open state, the overhanging portion 15a is brought into contact with the first curved projection 21g and the second curved projection 22g of the first arm 21b and the second arm 22b and slides, so as to have a function as a wall surface to regulate upward movement of the first arm 21b and the second arm 22b.

A claw portion 16 is formed at the top center outside each of a pair of the other opposed side walls 12b in the square frame 12. The claw portion 16 is for preventing the operation unit 50 from being easily detached upward.

The bottom 11 is formed with an annular groove-like coil spring accommodating portion 11a that supports and accommodates the coil spring 40, and a terminal through hole 11b that allows passage of a terminal of the switch mechanism 30.

Next, the link member 20 is made up of a pair of the first link member 21 and the second link member 22, to support the operation unit 50 with respect to the base 10 so that the operation unit 50 moves in a vertical direction.

The first link member 21 and the second link member 22 have the same shape and are coupled to each other by a coupling portion 23 mutually coupled at one end on the center side and combined in a V shape in a side view. In the embodiment, the coupling portion 23 is made up of a shaft portion 21a formed in the first link member 21 and a shaft hole portion 22a formed in the second link member 22, and turnably couples between the pair of link members 20. Note that a shaft portion may be formed in the second link member 22 and a shaft hole portion may be formed in the first link member 21.

The shaft portion 21a and the shaft hole portion 22a are pivotally supported and coupled in a turnable manner in a loosely fitted state, and a gap is constant in this loosely fitted portion.

Figure 4:
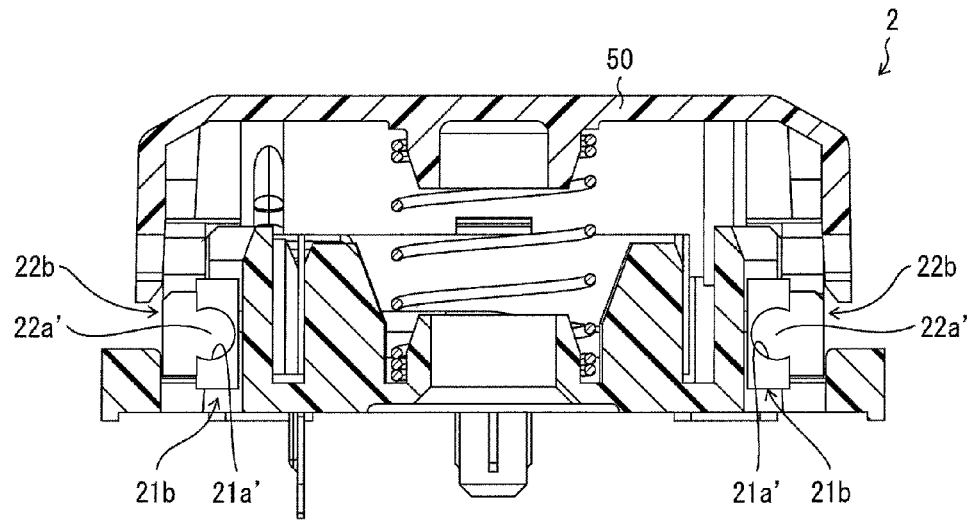
FIG. 4 is a sectional view illustrating a configuration of a modified example of the switch.

In the switch 1 of the embodiment, the coupling portion 23 is made up of the shaft portion formed in one of the first link member 21 and the second link member 22, and the shaft hole portion formed in the other of the first link member 21 and the second link member 22, but the shaft portion and the shaft hole portion are not necessarily restrictive. For example, as illustrated in FIG. 4, there may be provided a switch 2 made up of a sphere portion 22a' formed in one of the first link member 21 and the second link member 22, and a sphere acceptor 21a' that rotatably holds this spherical portion 22a'.

The first link member 21 and the second link member 22 integrally include the first arm 21b and the second arm 22b as a pair of connection members extending laterally in parallel to each other from the coupling portion 23, and a first latching rod 21c and a second latching rod 22c which couple between the first arm 21*b* and the second arm 22*b* at the ends on the opposite side from the coupling portion 23.

Figure 5:
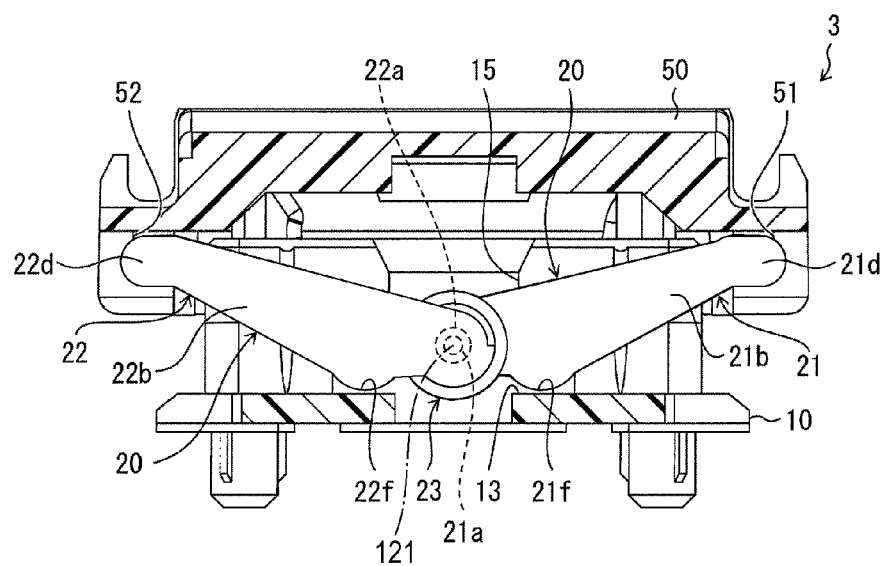
FIG. 5 is a sectional view illustrating a configuration of another modified example of the switch.
Figure 6A:
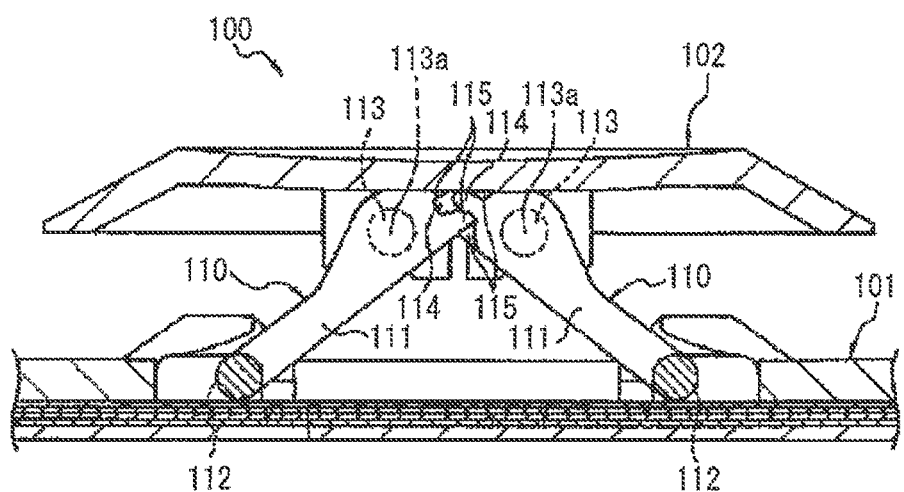
FIG. 6(a) is a sectional view illustrating a state of the conventional key switch device when a key top is not depressed.
Figure 6B:
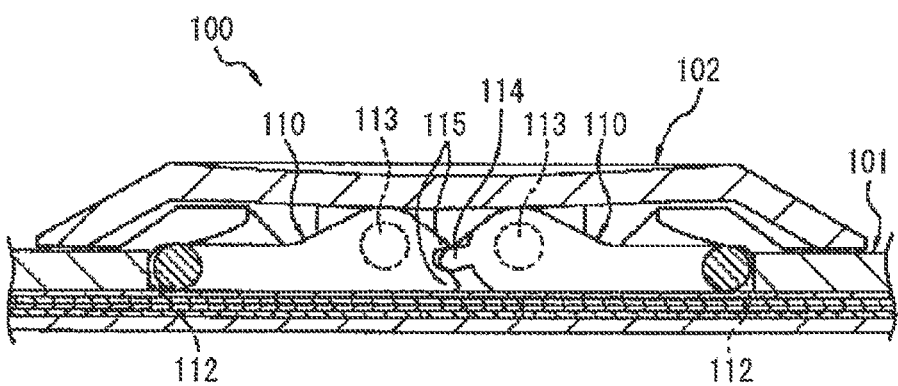
FIG. 6(b) is a sectional view illustrating a state when the key top is depressed.
Figure 7:
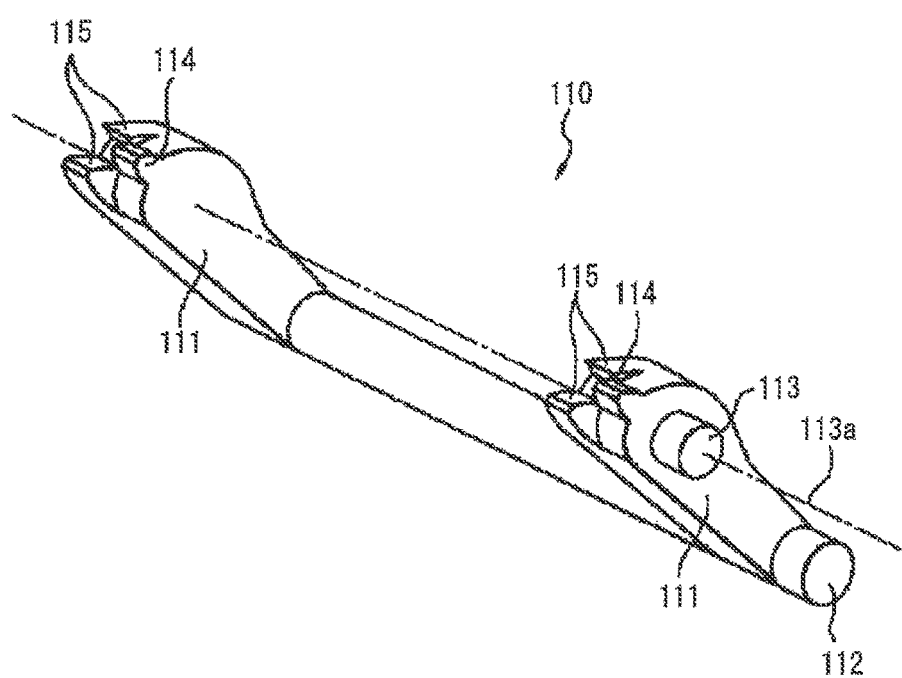
FIG. 7 is a perspective view illustrating shapes of a first tooth and a second tooth which are portions where a pair of link members are meshed with each other in the conventional key switch device.

As illustrated in FIGS. 1(*a*) to 3, portions of the first arm 21*b* and the second arm 22*b*, which face the operation unit 50, are formed in a staircase shape, for example. However, this is not necessarily restrictive, and for example as illustrated in FIG. 5, there can be provided a switch 3 in which the portions of the first arm 21*b* and the second arm 22*b*, which face the operation unit 50, are formed linearly from the coupling portion 23 to a first rotary spindle 21*d* and a second rotary spindle 22*d*, and the first arm 21*b* and the second arm 22*b* are formed in a substantially triangular shape in cross section. In addition, the shapes of the first arm 21*b* and the second arm 22*b* are not limited to this, and may be a plate shape or a bar shape.

Both ends of the first latching rod 21*c* and the second latching rod 22*c* are respectively formed with the first rotary spindles 21*d* and the second rotary spindles 22*d* as end-side supported portions. The first rotary spindle 21*d* and the second rotary spindle 22*d* are to be accepted by a first bearing 51 and a second bearing 52, described later, provided in the operation unit 50.

In the embodiment, the first rotary spindle 21*d* and the second rotary spindle 22*d* are to be accepted in the loosely fitted state by the first bearing 51 and the second bearing 52 as sliding regulators. As a result, in the embodiment, in conjunction with the movement of the operation unit 50 in the vertical direction (contacting/separating direction) with respect to the base 10, the first rotary spindle 21*d* and the second rotary spindle 22*d* are slidable in a direction substantially perpendicular to the vertical direction (contacting/separating direction). A sliding range for the first rotary spindle 21*d* is regulated by the inner surfaces of a first bearing 51 disposed on both sides of the first rotary spindle 21*d* in a direction substantially perpendicular to the contacting/separating direction and in a direction substantially perpendicular to the rotational axis 121 of the link member 22. A sliding range for the second rotary spindle 22*d* is regulated by the inner surfaces of a second bearing 52 disposed on both sides of the second rotary spindle 22*d* in the direction substantially perpendicular to the contacting/separating direction and in the direction substantially perpendicular to the rotational axis 121 of the link member 22.

The respective centers of the first latching rod 21*c* and the second latching rod 22*c* are formed with an upper end flat surface portion 21*e* and an upper end flat surface portion 22*e* having flat upper surfaces so that the postures at the upper end positions of the operation unit 50 are held in parallel to the base 10.

Sections of the first arm 21*b* and the second arm 22*b* which are near the coupling portion 23 are formed with a first curved portion 21*f* and a second curved portion 22*f* as coupling-portion-side supported portions protruding downward in a curved shape. As a result, the first curved portion 21*f* is disposed as shifted to the base 10 side from a straight line L2 connecting the coupling portion 23 and the first rotary spindle 21*d*, and the second curved portion 22*f* is disposed as shifted to the base 10 side from a straight line L1 connecting the coupling portion 23 and the second rotary spindle 22*d*.

In the embodiment, upon turning of the first link member 21 and the second link member 22, the first curved portion 21*f* and the second curved portion 22*f* slide on the upper surface of the guard portion 13 of the base 10, and the first curved projection 21*g* and the second curved projection 22*g* slide on the lower surface of the overhanging portion 15*a* in the side wall recessed groove portion 15 of the base 10. As a result, when the operation unit 50 is depressed to a lower limit position and the first link member 21 and the second link member 22 come into the open state, the coupling portion 23 is lifted to a slightly higher position than the first curved portion 21*f* and the second curved portion 22*f*. This can reduce variation in interval between the first rotary spindle 21*d* of the first link member 21 and the second rotary spindle 22*d* of the second link member 22 when the operation unit 50 moves in the vertical direction with respect to the base 10.

Further, near the coupling portion 23 inside the first arm 21*b* and the second arm 22*b* of the present embodiment, as illustrated in FIG. 3, the upper surface thereof is in contact with the overhanging portion 15*a* of the sidewall concave groove 15A first curved projection 21*g* and a second curved projection 22*g* in a curved shape projecting so as to be in contact with each other are formed. The first curved projection 21*g* and the second curved projection 22*g* are formed such that when the first link member 21 and the second link member 22 are opened around the coupling portion 23, the upper surface of the first curved projection 21*g* and the second curved projection 22*g* And slides while abutting against the portion 15*a*. As a result, the first curved projection 21*g* and the second curved projection 22*g* are disposed as shifted downward from the straight lines connecting between the coupling portion 23 and the first rotary spindle 21*d*/the second rotary spindle 22*d*.

Next, the switch mechanism 30 is made up of two L-shaped conductive plates 31, 32 formed of a flexible metal provided so as to come into contact with each other when the operation unit 50 is depressed. On the L-shaped conductive plates 31, 32, lead terminals 31*a*, 32*a* for connecting to a substrate (not illustrated) are provided extending downward. On the respective side surfaces of the conductive plates 31, 32, contact terminals 31*b*, 32*b* are provided facing each other. The ends of the L-shaped conductive plates 31, 32 are formed with cam slid portions 31*c*, 32*c* which are each slid by a sliding cam, not illustrated, which is provided on the rear surface of the operation unit 50. When the operation unit 50 is not depressed, the sliding cam of the operation unit 50 comes into contact with the cam sliding portions 31*c*, 32*c* of the L-shaped conductive plates 31, 32 to press the cam slid portions 31*c*, 32*c* and bend the L-shaped conductive plates 31, 32, so that the contact terminals 31*b*, 32*b* of the L-shaped conductive plates 31, 32 are not in contact with each other. On the other hand, when the operation unit 50 is depressed, the sliding cam of the operation unit 50 does not come into contact with each of the cam sliding portions 31*c*, 32*c* of the L-shaped conductive plates 31, 32, so that the contact terminals 31*b*, 32*b* of the L-shaped conductive plates 31, 32 come into contact with each other. As a result, at the time of depressing the operation unit 50, the L-shaped conductive plate 31 and the L-shaped conductive plate 32 become conductive and the switch is turned on.

Note that the switch mechanism 30 of the embodiment is not limited to what has been described above, but may be any configuration having a function as a switch, such as a membrane switch or a contactless switch.

Next, the coil spring 40 applies an urging force to the depression of the operation unit 50 and restores the operation unit 50 into the original state prior to the depression. Note that the coil spring 40 may be another elastic member.

Next, the operation unit 50 is a dish-shaped member having a substantially rectangular planar shape and is provided with a pair of the first bearings 51 and a pair of the second bearings 52 that are rotatably latched to the first rotary spindle 21*d* and the second rotary spindle 22*d* of the first link member 21 and the second link member 22. As a result, the operation unit 50 is supported by the first link member 21 and the second link member 22 in a freely depressed manner.

In the switch 1 of the embodiment, the following case has been described. The pair of link members 20 includes the first curved portion 21f and the second curved portion 22f as the coupling-portion-side supported portions supported by the base 10, and the first rotary spindle 21d and the second rotary spindle 22d as the end-side supported portion supported by the operation unit 50. When the operation unit 50 moves in the vertical direction with respect to the base 10, the first curved portion 21f, the second curved portion 22f, the first curved projection 21g, and the second curved projection 22g slide in the direction substantially perpendicular to the vertical direction with respect to the base 10 and in the direction substantially perpendicular to the rotational axis 121 of the pair of link members 20.

However, the present invention is not necessarily limited thereto, and the following configuration may be formed. The pair of link members 20 includes the coupling-portion-side supported portion supported by the operation unit 50 and the end-side supported portion supported by the base. When the operation unit 50 moves in the vertical direction with respect to the base 10, the coupling-portion-side supported portion slides in the direction substantially perpendicular to the vertical direction (contacting/separating direction) with respect to the operation unit and in the direction substantially perpendicular to the rotational axis 121 of the pair of link members 20.

(Operation of Switch)

Figure 1A:
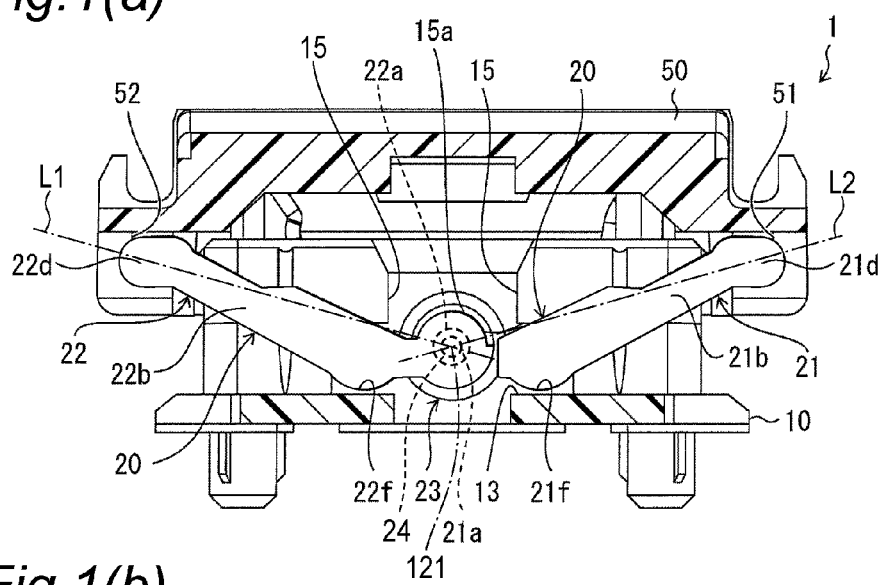
FIG. 1(*a*) is a sectional view illustrating one embodiment of a switch in the present invention, the view illustrating a state of the switch when an operation unit is not depressed, and FIG. 1(*b*) is a sectional view illustrating a state of the switch when the operation unit is depressed.
Figure 1B:
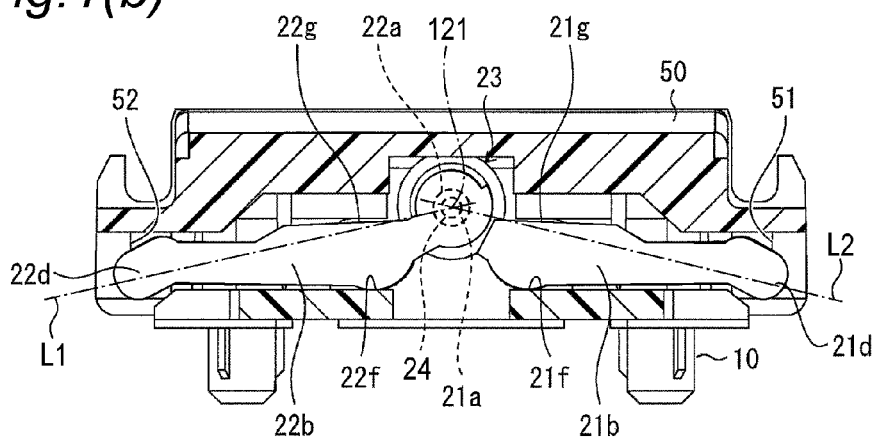

The operation of the switch 1 having the above configuration when the operation unit 50 is not depressed and when the operation unit 50 is depressed will be described with reference to FIGS. 1(a), 1(b) and FIGS. 2(a), 2(b). FIG. 1(a) is a sectional view illustrating a state of the switch 1 when the operation unit 50 is not depressed, namely, a state in which the operation unit 50 is present at an upper limit position. FIG. 1(b) is a sectional view illustrating a state of the switch 1 when the operation unit 50 is depressed, namely, a state in which the operation unit 50 is present at the lower limit position.

As illustrated in FIGS. 1(a) and 2(a), when the operation unit 50 of the switch 1 is not depressed, namely, before depressed, the operation unit 50 is present at the upper limit position. At this time, the first link member 21 and the second link member 22 are supported by the coupling portion 23 pivotally supporting one ends of the first arm 21b and the second arm 22b in a turnable manner and by the first bearing 51 and the second bearing 52 of the operation unit 50 accepting the other ends of the first rotary spindle 21d and the second rotary spindle 22d.

When a user depresses the operation unit 50 with a finger or the like from the above state, the first bearing 51 and the second bearing 52 of the operation unit 50 are depressed so that the first link member 21 and the second link member 22 are turned around the coupling portion 23 while sliding in contact portions between the first curved portion 21f/the second curved portion 22f and the guard portion 13 of the base 10 and in contact portions between the first curved projection 21g/the second curved projection 22g and the overhanging portion 15a of the side wall recessed groove portion 15. At this time, the first rotary spindle 22d in the first arm 21b and the second arm 22b of the first link member 21 and the second link member 22 move in the perpendicular direction while making small movement outward. As a result, the first link member 21 and the second link member 22 lift the coupling portion 23 when sliding in the contact portions between the first curved portion 21f/the second curved portion 22f and the guard portion 13 of the base 10 and in the contact portions between the first curved projection 21g/the second curved projection 22g and the overhanging portion 15a of the side wall recessed groove portion 15.

Therefore, as illustrated in FIG. 1(b) and FIG. 2(b), even when the operation unit 50 moves to the lower limit position, the operation unit 50 can move while the lengths of the first arm 21b and the second arm 22b cause no problem. By the downward movement of the operation unit 50, the L-shaped conductive plate 31 of the switch mechanism 30 is bent by the sliding cam (not illustrated) formed on the rear surface of the operation unit 50, and the contact terminal 31b of the L-shaped conductive plate 31 comes into contact with the contact terminal 32b of the L-shaped conductive plate 32. As a result, the L-shaped conductive plate 31 and the L-shaped conductive plate 32 become conductive, and the switch is turned on.

When the user releases the press of the finger to the operation unit 50 from the state of depressing the operation unit 50, the operation unit 50 is restored to the original upper limit position by the urging force of the coil spring 40.

As a result, in the switch 1 of the embodiment, in the depressing operation of the operation unit 50, only the first rotary spindle 21d and the second rotary spindle 22d are latched to the first bearing 51 and the second bearing 52, so that the clearance is constant, and there is little risk of biting of a foreign matter.

In addition, by the depression of the operation unit 50, the sliding position moves mainly in the first curved portion 21f and the second curved portion 22f of the first link member 21 and the second link member 22 and the guard portion 13, so that the outer edges of the first link member 21 and the second link member 22 hardly spread outward.

As thus described, the switch 1 of the embodiment includes: the base 10; the operation unit 50 disposed on the base 10 and moving in the vertical direction in response to an external force; the pair of link members 20 configured to guide movement of the operation unit 50 in the vertical direction; and the coupling portion 23 configured to pivotally support and couple the pair of link members 20 to each other in a turnable manner, the pair of link members 20 each including the first curved portion 21f and the second curved portion 22f as the coupling-portion-side supported portions supported on one of the base 10 and the operation unit 50 and the first rotary spindle 21d and the second rotary spindle 22d as the end-side supported portions supported on the other of the base 10 and the operation unit 50. When the operation unit 50 moves in the vertical direction with respect to the base 10, the first curved portion 21f and the second curved portion 22f slide with respect to one of the base 10 and the base 50 in the direction substantially perpendicular to the vertical direction and in the direction substantially perpendicular to the pair of link members 20 at the coupling portion 23.

It is thereby possible to form a structure in which, when the operation unit 50 moves in the vertical direction with respect to the base 10, whichever part of the operation unit 50 is pressed, it is possible to achieve a structure capable of maintaining a state in which the operation unit 50 faces a certain direction with respect to the base 10, such as being parallel to the base 10.

In addition, when the operation unit 50 moves in the vertical direction with respect to the base 10, the first curved portion 21f and the second curved portion 22f slide with respect to one of the base 10 and the operation unit 50 in the direction substantially perpendicular to the vertical direction and in the direction substantially perpendicular to the pair of link members 20 at the coupling portion 23. This can result in reduction in amount of sliding of the first curved portion 21f and the second curved portion 22f in the direction substantially perpendicular to the vertical direction and in the direction substantially perpendicular to the pair of link members 20 at the coupling portion 23. It is thus possible to make the distance between the coupling portion and the end-side supported portion as long as possible within a limited space.

Therefore, according to the switch 1 of the embodiment, it is possible to provide the switch 1 that is capable of more stably maintaining the state in which the operation unit 50 faces a certain direction when the operation unit 50 moves in the vertical direction with respect to the base 10.

Further, in the switch 1 of to the embodiment, when the operation unit 50 moves in the vertical direction with respect to the base 10, both the first and second curved portions 21f, 22f and the first and second rotary spindles 21d, 22d can slide with respect to the base 10 and the operation unit 50 in the direction substantially perpendicular to the vertical direction and in the direction substantially perpendicular to the pair of link members 20 at the coupling portion 23.

As a result, it is possible to reduce the distance that the first and second curved portions 21f, 22f and the first and second rotary spindles 21d, 22d slide, as compared to a configuration in which only one of the first and second curved portions 21f, 22f and the first and second rotary spindles 21d, 22d slide. That is, since abrasion in the first and second curved portions 21f, 22f and the first and second rotary spindles 21d, 22d can be reduced, in the switch 1 in which the number of operations becomes enormous, a highly reliable structure can be provided. In particular, in the embodiment, since the first curved projection 21g and the second curved projection 22g slide on the overhanging portion 15a, the abrasion in the first and second curved portions 21f, 22f and the first and second rotary spindles 21d, 22d can further be reduced.

In the switch 1 of the embodiment, the first curved portion 21f and the second curved portion 22f as the coupling-portion-side supported portion are disposed as shifted to the base 10 side or the operation unit 50 side, on which the first curved portion 21f and the second curved portion 22f are supported, from straight lines connecting between the coupling portion 23 and the first rotary spindle 21d/the second rotary spindle 22d.

This can reduce variation in interval between the first curved portion 21f and the second curved portion 22f in each of the pair of link members 20 when the operation unit 50 moves in the vertical direction with respect to the base 10. That is, it is possible to reduce an amount of sliding of the first curved portion 21f and the second curved portion 22f in the direction substantially perpendicular to the vertical direction and in the direction substantially perpendicular to the pair of link members 20 at the coupling portion 23.

Further, in the switch 1 of the embodiment, the base 10 or the operation unit 50 supporting the first curved portion 21f and the second curved portion 22f as the coupling-portion-side supported portions includes an overhanging portion 15a as the wall surface that regulates movement of the first curved portion 21f and the second curved portion 22f in the first arm 21b and the second arm 22b in the vertical direction. The first curved portion 21f and the second curved portion 22f slide in the direction substantially perpendicular to the vertical direction and in the direction substantially perpendicular to the pair of link members 20 at the coupling portion 23 within a space 15b between the overhanging portion 15a and the base 10 or the operation unit 50.

Thus, since the base 10 or the operation unit 50 on which the first curved portion 21f and the second curved portion 22f are supported is provided with the overhanging portion 15a, with the simple structure, it is possible to achieve a configuration in which the first curved portion 21f and the second curved portion 22f slide in the direction substantially perpendicular to the vertical direction and in the direction substantially perpendicular to the pair of link members 20 at the coupling portion 23.

Further, in the switch 1 of the embodiment, the coupling portion 23 pivotally supports and couples each of the pair of link members 20 in a turnable manner in a loosely fitted state, and a gap 24 of a loosely fitted part in the coupling portion 23 is constant when the operation unit 50 moves in the vertical direction with respect to the base 10.

This can reduce the risk of foreign matter entering the loosely fitted part as compared to a configuration in which the gap fluctuates, such as a configuration in which coupling is made by meshing between gears, so that it is possible to provide a highly reliable switch 1.

Further, in the switch 1 of the embodiment, the pair of link members 20 is made up of the first link member 21 and the second link member 22, and the coupling portion 23 is made up of the shaft portion 21a provided on one of the first link member 21 and the second link member 22, and the shaft hole portion 22a provided on the other of the first link member 21 and the second link member 22 and loosely fitted to the shaft portion 21a.

Thus, since the coupling portion 23 is made up of the shaft portion 21a and the shaft hole portion 22a loosely fitted thereto, the gap of the loosely fitted portion in the coupling portion 23 can be made very small. This can result in significant reduction in risk of foreign matter entering the loosely fitted part, so that a highly reliable switch can be provided.

Further, the keyboard of the embodiment includes a plurality of switches 1 of the embodiment. It is thereby possible to provide a keyboard including the switch 1 capable of more stably maintaining the state in which the operation unit 50 faces a certain direction when the operation unit 50 moves in the vertical direction with respect to the base 10.

A variety of embodiments of the present invention have been described in detail with reference to the drawings, and lastly, a variety of aspects of the present invention will be described.

For solving the above problem, a switch of a first aspect of the present invention includes: a base; an operation unit disposed on the base and moving in a vertical direction in response to an external force; a pair of link members configured to guide movement of the operation unit in the vertical direction; and a coupling portion configured to pivotally support and couple the pair of link members to each other in a turnable manner, the pair of link members each including a coupling-portion-side supported portion supported on one of the base and the operation unit and an end-side supported portion supported on the other of the base and the operation unit. When the operation unit moves in the vertical direction with respect to the base, the coupling-portion-side supported portion slides with respect to one of the base and the operation unit in a direction substantially perpendicular to the vertical direction.

In other words, in the switch of the first aspect of the present invention includes: a base; an operation unit disposed on the base and moving in a contacting/separating direction with respect to the base in response to an external force; a pair of link members configured to guide movement of the operation unit in the contacting/separating direction; and a coupling portion configured to turnably couple the pair of link members to each other, the pair of link members each including a coupling-portion-side supported portion supported on one of the base and the operation unit and an end-side supported portion supported on the other of the base and the operation unit. When the operation unit moves in the contacting/separating direction with respect to the base, the coupling-portion-side supported portion slides with respect to one of the base and the operation unit in a direction substantially perpendicular to the contacting/separating direction and in a direction substantially perpendicular to a rotational axis of the pair of link members.

According to the switch of the first aspect, the pair of link members couples the base and the operation unit to each other. In addition, the coupling portion pivotally couples the pair of link members to each other in a turnable manner. With these configurations, when the operation unit is moved in the vertical direction with respect to the base, even if any portion of the operation unit is pressed, it is possible to realize a structure capable of maintaining the state that the operation unit is oriented in a certain direction, for example, parallel to the base.

In this structure, in order to move the operation unit a certain distance in the contacting/separating direction with respect to the base, it is necessary to convert the movement in the contacting/separating direction to the direction substantially perpendicular to the contacting/separating direction in the link member. In contrast, according to the configuration of the present invention, at the time when the operation unit moves in the contacting/separating direction with respect to the base, the coupling-portion-side supported portion slides in the direction substantially perpendicular to the contacting/separating direction with respect to one of the base and the operation unit. This can result in reduction in amount of sliding of the end-side supported portion in the direction substantially perpendicular to the contacting/separating direction.

The longer the distance between the coupling portion and the end-side supported portion, the more stable the support of the operation unit. That is, due to the possibility to reduce the amount of sliding of the end-side supported portion in the direction substantially perpendicular to the contacting/separating direction, the distance between the coupling portion and the end-side supported portion can be taken as long as possible within a limited space.

Therefore, in the present invention, it is possible to provide a switch capable of more stably maintaining a state in which the operation unit faces a certain direction when the operation unit moves in the contacting/separating direction with respect to the base.

In a switch of a second aspect of the present invention, in the switch described above, when the operation unit moves in the vertical direction with respect to the base, both the coupling-portion-side supported portion and the end-side supported portion slide with respect to the base and the operation unit in the direction substantially perpendicular to the vertical direction.

In other words, in the switch of the second aspect of the present invention, when the operation unit moves in the contacting/separating direction with respect to the base, both the coupling-portion-side supported portion and the end-side supported portion slide with respect to the base and the operation unit in the direction substantially perpendicular to the contacting/separating direction and in the direction substantially perpendicular to the rotational axis of the pair of link members.

According to the switch of the second aspect, it is possible to reduce the distance that the coupling-portion-side supported portion and the end-side supported portion slide, as compared to a configuration in which only one of the coupling-portion-side supported portion and the end-side supported portion slides. That is, since abrasion in the coupling-portion-side supported portion and the end-side supported portion can be reduced, in the switch in which the number of operations becomes enormous, a highly reliable structure can be provided.

In a switch of a third aspect of the present invention, in the switch described above, the coupling-portion-side supported portion is disposed as shifted to a base side or an operation unit side, on which the coupling-portion-side supported portion is supported, from a straight line connecting the coupling portion and the end-side supported portion.

According to the switch of the third aspect, it is possible to reduce variation in interval between the end-side supported portions in each of the pair of link members when the operation unit moves in the contacting/separating direction with respect to the base. That is, it is possible to reduce the amount of sliding of the end-side supported portion in the direction substantially perpendicular to the contacting/separating direction.

In the switch of the fourth aspect of the present invention, in the switch described above, the base or the operation unit supporting the coupling-portion-side supported portion includes a wall surface that regulates movement of the operation unit of the coupling-portion-side supported portion in the vertical direction, and the coupling-portion-side supported portion slides in the direction substantially perpendicular to the vertical direction within a space between the wall surface and the base or the operation unit.

In other words, in the switch of the fourth aspect of the present invention, the base or the operation unit supporting the coupling-portion-side supported portion includes a wall surface that regulates movement of the operation unit of the coupling-portion-side supported portion in the contacting/separating direction, and the coupling-portion-side supported portion slides in the direction substantially perpendicular to the contacting/separating direction of the operation unit and in the direction substantially perpendicular to the turning shaft of the pair of link members within a space between the wall surface and the base or the operation unit.

According to the switch of the fourth aspect, since the base or the operation unit on which the coupling-portion-side supported portion is supported includes the wall surface as described above, with the simple structure, it is possible to achieve a configuration in which the coupling-portion-side supported portion slides in the direction substantially perpendicular to the contacting/separating direction.

In a switch of a fifth aspect of the present invention, the coupling portion pivotally supports and couples each of the pair of link members in a turnable manner in a loosely fitted state, and a gap of a loosely fitted part in the coupling portion is constant when the operation unit moves in the vertical direction (contacting/separating direction) with respect to the base.

According to the switch of the fifth aspect, the gap of the loose-fitted portion in the coupling portion is constant when the operation unit moves in the contacting/separating direction with respect to the base. This can result in reduction in risk of foreign matter entering the loosely fitted part as compared to a configuration in which the gap fluctuates, such as a configuration in which coupling is made by meshing between gears, so that it is possible to provide a highly reliable switch.

In a switch of a sixth aspect of the present invention, in order to solve the above problem, the pair of link members is made up of a first link member and a second link member, and the coupling portion is made up of a shaft portion provided on one of the first link member and the second link member, and a shaft hole portion provided on the other of the first link member and the second link member and loosely fitted to the shaft portion.

According to the switch of the sixth aspect, the coupling portion is made up of the shaft portion and the shaft hole portion loosely fitted thereto, so that the gap of the loosely fitted portion in the coupling portion can be made very small. This can result in significant reduction in risk of foreign matter entering the loosely fitted part, so that a highly reliable switch can be provided.

A keyboard of a seventh aspect of the present invention includes a plurality of switches of the above aspect in order to solve the above problems.

According to the keyboard of the seventh aspect, it is possible to provide a keyboard including the switch of the above aspect capable of more stably maintaining a state in which the operation unit faces a certain direction when the operation unit moves in the contacting/separating direction with respect to the base.

By appropriately combining freely selected embodiments or modifications of the above variety of embodiments and modifications, it is possible to achieve the respective effects of those combined. It is possible to combine embodiments, combine examples, or combine an embodiment and an example, and it is also possible to combine features in different embodiments or examples.

While the present invention has been fully described in connection with the preferred embodiments with reference to the accompanying drawings, a variety of modified examples or corrections will be apparent to those skilled in the art. Such modifications or amendments are to be understood as being included in the scope of the present invention according to the appended claims so long as not deviating therefrom.

INDUSTRIAL APPLICABILITY

The switch of the present invention is applicable to, for example, a keyboard for a personal computer.

The keyboard of the present invention is usable as, for example, a keyboard for a personal computer.

DESCRIPTION OF SYMBOLS

1~3 switch
10 base
11 bottom
12 square frame
12a one opposed side wall
12b the other opposed side wall
13 guard portion
14 extrusion preventing wall (example of deformation preventing portion)
15 side wall recessed groove portion (example of gap)
15a overhanging portion (example of wall surface)
16 claw portion
20 link member
21 first link member
21a shaft portion (example of coupling portion)
21b first arm (example of connection member)
21c first latching rod
21d first rotary spindle (example of end-side supported portion)
21e upper end flat portion
21f first curved portion (example of coupling-portion-side supported portion)
21g first curved projection
22 second link member
22a shaft hole portion (example of coupling portion)
22b second arm (example of connection member)
22c second latching rod
22d second rotary spindle (example of end-side supported portion)
22e upper end flat portion
22f second curved portion (example of coupling-portion-side supported portion)
22g second curved projection
23 coupling portion
30 switch mechanism
31, 32 L-shaped conductive plate
31a, 32a lead terminal
31b, 32b contact terminal
31c, 32c cam turned portion
40 coil spring
50 operation unit
51 first bearing (example of sliding regulator)
52 second bearing (example of sliding regulator)

The invention claimed is:

1. A switch comprising:
a base;
an operation unit disposed on the base and moving in a contacting/separating direction with respect to the base in response to an external force;
a pair of link members configured to guide movement of the operation unit in the contacting/separating direction; and
a coupling portion configured to turnably couple the pair of link members to each other around a rotational axis of the pair of link members,
the pair of link members each including a coupling-portion-side supported portion supported on the base and an end-side supported portion supported on the operation unit,
wherein, when the operation unit moves in the contacting/separating direction with respect to the base, the coupling-portion-side supported portion slides with respect to one of the base and the operation unit in a direction substantially perpendicular to the contacting/separating direction and in a direction substantially perpendicular to the rotational axis of the pair of link members,
the coupling-portion-side supported portion protrudes downward in a curved shape,
the base includes a frame including a bottom expanding in a direction substantially perpendicular to the contacting/separating direction and a pair of one opposed side walls, each of the pair of one opposed side walls extending in the contacting/separating direction and in a direction away from the bottom and including a side wall recessed groove portion provided in a center portion of the one opposed side wall, the side wall recessed groove portion extending in the contacting/separating direction and being configured that the coupling portion can move in the contacting/separating direction, the side wall recessed groove portion includes an overhanging portion disposed in an end of the side wall recessed groove portion in the contacting/separating direction apart from the bottom, and the overhanging portion is configured to face the bottom and be brought into contact with the pair of link members housed between the overhanging portion and the bottom to regulate a movement of the pair of link members housed in the contacting/separating direction and in the direction away from the bottom.

2. The switch according to claim 1, wherein, when the operation unit moves in the contacting/separating direction with respect to the base, both the coupling-portion-side supported portion and the end-side supported portion slide with respect to the base and the operation unit in the direction substantially perpendicular to the contacting/separating direction and in the direction substantially perpendicular to the rotational axis of the pair of link members.

3. The switch according to claim 1, wherein the coupling portion pivotally supports and couples each of the pair of link members in a turnable manner in a loosely fitted state forming a gap, and the gap between portions of the coupling potion is constant when the operation unit moves in the contacting/separating direction with respect to the base.

4. The switch according to claim 3, wherein the pair of link members is made up of a first link member and a second link member, and the coupling portion is made up of a shaft portion provided on one of the first link member and the second link member, and a shaft hole portion provided on the other of the first link member and the second link member and loosely fitted to the shaft portion.

5. A keyboard comprising a plurality of the switches according to claim 1.

\* \* \* \* \*